C. A. THOMAS.
DOUGH CUTTING DEVICE.
APPLICATION FILED APR. 29, 1916.
1,267,478.
Patented May 28, 1918.
2 SHEETS—SHEET 1.
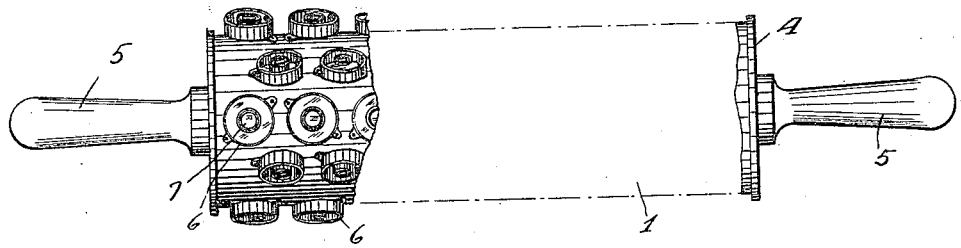
Fig. 1
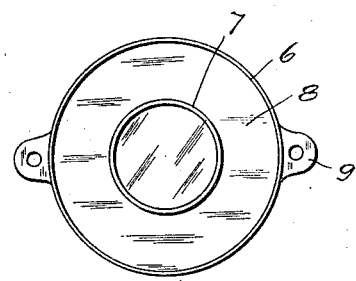
Fig. 2
Fig. 10
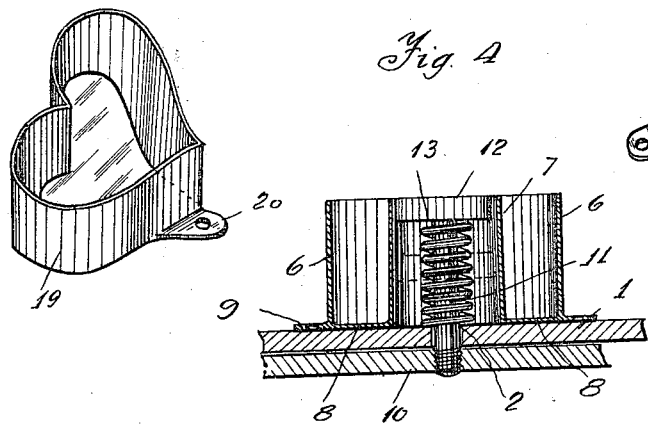
Fig. 4
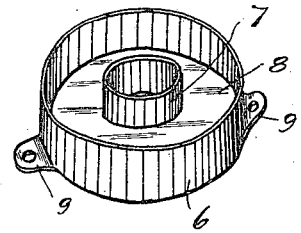
Fig. 3
INVENTOR
Charles A. Thomas
By Max H. Srolovitz
Atty.

C. A. THOMAS.
DOUGH CUTTING DEVICE.
APPLICATION FILED APR. 29, 1916.
1,267,478.
Patented May 28, 1918.
2 SHEETS—SHEET 2.
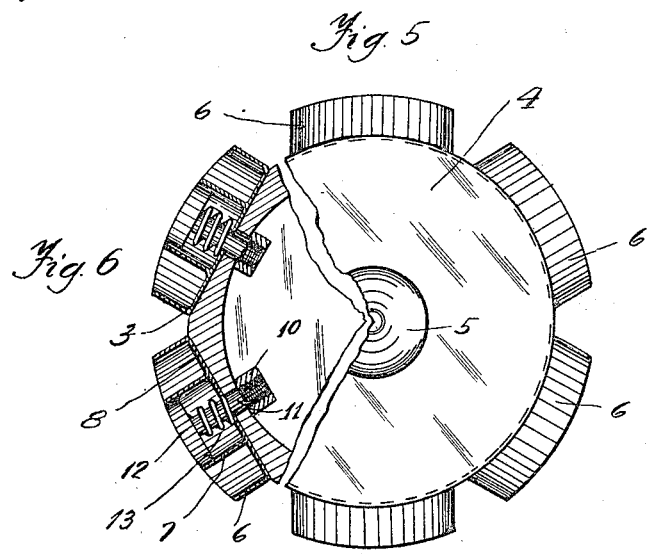
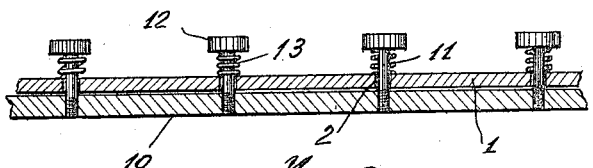
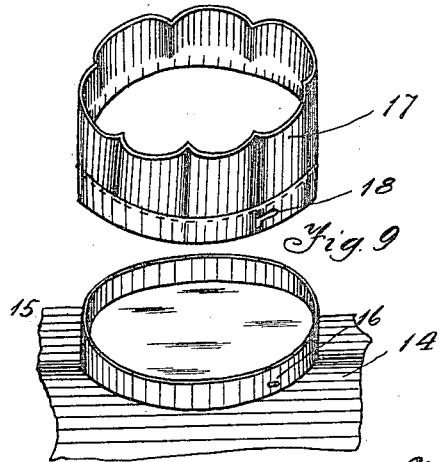
INVENTOR
Charles A. Thomas
By May H. Arolovits
atty.

# UNITED STATES PATENT OFFICE.

CHARLES A. THOMAS, OF WILKINSBURG, PENNSYLVANIA.

DOUGH-CUTTING DEVICE.

1,267,478.  Specification of Letters Patent.  Patented May 28, 1918.

Application filed April 29, 1916. Serial No. 94,371.

*To all whom it may concern:*

Be it known that I, CHARLES A. THOMAS, a citizen of the United States, residing at Wilkinsburg, in the county of Allegheny and State of Pennsylvania, have invented certain new and useful Improvements in Dough-Cutting Devices, of which the following is a specification.

This invention relates to dough cutting device, designed particularly for the cutting of doughnuts, cakes and cookies and has for its object to provide a device of such type having means, in a manner as hereinafter set forth, for expelling that portion of the dough which is removed to provide the opening in the cut of dough from which is formed the doughnut.

A further object of the invention is to provide, in a manner as hereinafter set forth, a dough cutting roller having means for detachably connecting cutters of various forms therewith, to provide for the cutting of dough in different shapes.

Further objects of the invention are to provide a dough cutting roller for the purpose set forth which is simple in its construction, strong, durable, efficient in its use and inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is an elevation, broken away, of a dough cutting machine in accordance with this invention.

Fig. 2 is a plan of one of the cutters.

Fig. 3 is a perspective of one of the cutters.

Fig. 4 is a sectional detail of the roller illustrating a cutter and a dough ejector.

Fig. 5 is an end view, broken away, of the dough cutting roller.

Fig. 6, is a vertical sectional view, broken away, of the dough cutting roller.

Fig. 7 is a detail illustrating the ejector mechanism.

Fig. 8 is a perspective view of a modified form of cutter.

Fig. 9 is a like view of a means of attaching the modified form of cutter.

Fig. 10 is a perspective view of still another modified form of cutter.

Referring to the drawings in detail 1 denotes a hollow cylindrical roll provided with spaced longitudinal rows of openings, the openings of one row being staggered with respect to the openings of an adjacent row. The openings of each of the rows are indicated at 2. The roll 1 has its periphery provided with longitudinal rows of flat spaces and with the spaces of one row staggered with respect to the spaces of the other row. Each of said spaces is indicated at 3 and an opening 2 is arranged centrally of a space 3. The roll has removable end plates 4 to each of which is attached a handle 5.

Secured to each of the flat spaces is a cutter consisting of a pair of concentric members 6, 7, connected together at their inner ends by a flat ring 8. The member 6 has laterally projecting apertured lugs 9 for the passage of securing devices to detachably connect the cutter in position. The openings 2 are disposed centrally with respect to the members 7. As the cutters are secured to the spaces 3 they are arranged in longitudinal rows and with the cutters of one row staggered with respect to the cutters of an adjacent row.

Associated with each row of cutters is a dough ejector mechanism and which consists of a carrier 10 formed of a longitudinally extending bar arranged within the roll 1. Secured to the carrier 10 is a series of spaced pins 11 which project through the openings 2 of that row which associates with the row of cutters. The pins 11 extend into the members 7 of the cutters, and each of the pins has attached to its outer end an ejector head 12. Interposed between the heads 12, and the roll 1 and surrounding the pins 11 are coiled expelling springs 13.

In the modified form shown in Figs. 9 and 10 the roll 14 has secured therewith collars 15, only one shown, and each of the collars carries a lug 16. The collars 15 and lugs 16 are employed for detachably connecting cutters of various shapes with the rolls. One example of detachable cutter is illustrated in Fig. 9, at 17 and which has a bayonet shaped slot 18 associating with the lug 16 to connect the cutters 17 to the collar 15.

Another form of cutter is shown in Fig. 10, at 19, and which has apertured lugs 20, so it can be secured to the roll 1 when the ejector mechanism and members 6 and 7 are removed.

The ejector mechanism are employed for expelling that portion of the dough which is removed by the member 7 to provide the opening in the cut of dough from which is formed the doughnut.

The roll 1 may be manually operated, or if desired attached with any suitable mechanism for revolving it.

What I claim is:—

A hand implement for cutting doughnut dough comprising a roll, a plate detachably connected to each end and of greater diameter than the roll, the axes of said plates registering with the axis of the roll whereby the plates will project beyond the periphery of the roll, an operating handle connected to each of said plates, a series of rows of cutters disposed at the periphery of said roll, each of said cutters consisting of a pair of spaced annular members arranged concentrically, the outer of each of said members being flanged and detachably connected to the roll, said inner members having an integral connection with said outer members at the inner ends of said cutters, said roll provided with openings communicating with said inner members, a pin projecting through each of said openings, a head carried on the outer end of the pin and operating in the inner member, said pins arranged in rows, a series of apertured bars loosely arranged in said roll and each associated with a row of pins the pins of each row detachably connected with a bar, a coil spring interposed between said rolls and said heads and surrounding the pins.

In testimony whereof I affix my signature in the presence of two witnesses.

CHARLES A. THOMAS.

Witnesses:
  LUELLA H. SIMON,
  B. E. JENKINS.

Copies of this patent may be obtained for five cents each, by addressing the "Commissioner of Patents, Washington, D. C."